United States Patent
Kagohara et al.

Patent Number: 6,012,850
Date of Patent: Jan. 11, 2000

[54] SLIDING BEARING ASSEMBLY

[75] Inventors: Yukihiko Kagohara; Koji Kitagawa; Akio Umemura; Mituru Sugita; Yoshiaki Sato; Hideo Ishikawa; Takayuki Shibayama, all of Nagoya, Japan

[73] Assignee: Daido Metal Company Ltd., Nagoya, Japan

[21] Appl. No.: 09/130,315

[22] Filed: Aug. 7, 1998

[30] Foreign Application Priority Data

Oct. 23, 1997 [JP] Japan .................................. 9-309960

[51] Int. Cl.$^7$ ...................................................... F16C 33/02
[52] U.S. Cl. ............................................. 384/276; 384/913
[58] Field of Search ................................... 384/276, 912, 384/913

[56] References Cited

U.S. PATENT DOCUMENTS

| | | | |
|---|---|---|---|
| 3,515,599 | 6/1970 | Connelly | 384/913 X |
| 5,137,792 | 8/1992 | Hodes et al. | 384/912 X |
| 5,352,541 | 10/1994 | Tanaka et al. | 384/913 X |
| 5,364,248 | 11/1994 | Nakashima et al. | 384/912 X |
| 5,803,614 | 9/1998 | Tsuji et al. | 384/276 |

FOREIGN PATENT DOCUMENTS

| | | |
|---|---|---|
| 61-088020 | 5/1986 | Japan . |
| 2-089813 | 3/1990 | Japan . |
| 6-094036 | 4/1994 | Japan . |

*Primary Examiner*—Thomas R. Hannon
*Attorney, Agent, or Firm*—Browdy and Neimark

[57] ABSTRACT

A sliding bearing assembly excellent in fretting resistance which comprises a sliding bearing and a housing, the sliding bearing having a bearing alloy layer in the internal surface of its backing metal layer and the internal surface of the housing being fitted with the sliding bearing, wherein a phosphate film is formed on the back of the backing metal layer of the sliding bearing, the phosphate film being composed of needle crystals or columnar crystals which have a particle size of not more than 30 $\mu$m when observed from the back of the backing metal layer.

3 Claims, 2 Drawing Sheets

×1000
10 μm

×450
10 μm

FIG.3A
FIG.3B
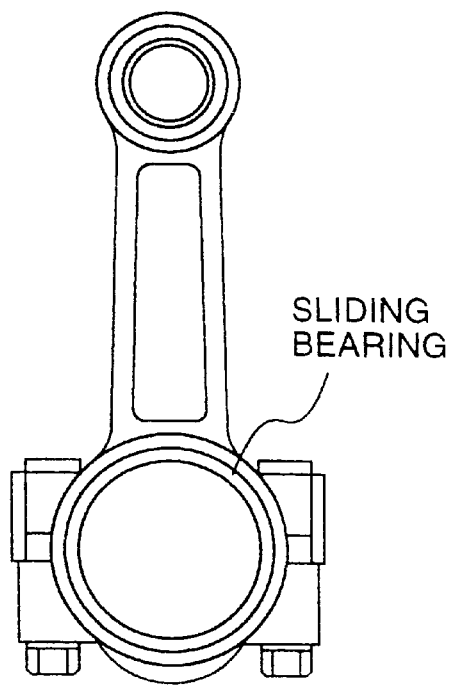
SLIDING BEARING
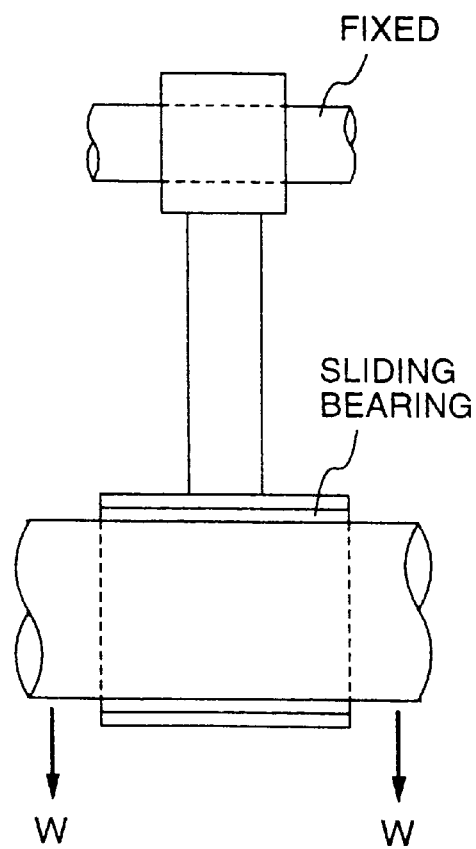
FIXED
SLIDING BEARING
W  W

SLIDING BEARING ASSEMBLY

BACKGROUND OF THE INVENTION

This invention relates to a sliding bearing assembly, particularly to a half sliding bearing assembly.

For the purpose of recent compacting and weight-saving or the like, the stiffness of a housing to be fitted with a sliding bearing has been lowered by thinning the wall of the housing, using an aluminum alloy, or the like. Therefore, a slight repetitive strain accompanying dynamic load becomes easier to cause in the housing and the bearing than before. In addition, in the big end bearing of a connecting rod or the main bearing in an internal combustion engine, a high speed, a high temperature and a high load have been required for a high output engine. Between the internal surface of the housing of the above big end portion or main bearing portion and the back of the sliding bearing with which the internal surface of the housing has been fitted, a relative, slight collision and slight sliding are caused accompanying the repetitive strain of the housing and the bearing, whereby a damage due to fretting abrasion has become easy to cause.

As a measure for the above fretting abrasion, there have heretofore been known a sliding bearing in which a coating layer of a resin type excellent in lubricity such as PTFE or the like is provided on the back of the sliding bearing and the sliding bearing in which such measures as providing a coating layer by plating with silver or copper and the like have been taken.

JP-A-61(1986)-88,020 discloses a sliding bearing in which a coating layer is formed of an alloy of copper, nickel, aluminum or the like having a hardness of Hv 15 to 80 on the back of the bearing. It states that these soft metal coating layers inhibit the fretting abrasion from being caused.

JP-A-2(1990)-89,813 discloses a sliding bearing in which the coating layer is a complex plating layer formed by simultaneously depositing PTFE and Ni or Co. This means that a complex plating layer of PTFE and Ni or Co is formed in order to prevent the PTFE from being peeled owing to its inferior bonding strength to the backing metal. It states that the fretting resistance can be well enhanced by preventing PTFE having a low friction coefficient from being peeled as mentioned above.

Moreover, JP-A-6(1994)-94,036 of the present Applicants discloses a sliding bearing in which as the coating layer, a phosphate film has been provided on the backing metal. This intends to enhance the fretting resistance by providing a phosphate film having a low friction coefficient.

However, with the soft coating layer composed of a metal having a hardness of Hv 15 to 80 stated in JP-A-61(1986)-88,020, an adhesion phenomenon tends to appear between the housing and the back of the bearing because of the insufficient stiffness of the coating layer, and fretting accompanying the adhesion phenomenon becomes easy to cause, so that by only softening the coating layer, no sufficient fretting resistance has been obtained.

Moreover, in the coating layer composed of PTFE and a metal such as Ni or the like stated in JP-A-2(1990)-89,813, there is still a case where PTFE is allowed to fall out by a slight abrasion between the housing and the back of the bearing, and it has been impossible to obtain sufficiently good fretting resistance.

SUMMARY OF THE INVENTION

The present inventors have repeated research on the phosphate film stated in JP-A-6(1994)-94,036 and consequently found that the fretting resistance can further be enhanced by finely dividing the crystal particles of the phosphate.

Therefore, this invention aims at allowing the bearing assembly to have much higher fretting resistance by adjusting the size of the crystal particles of phosphate to a specific one.

This invention is a sliding bearing assembly which comprises a sliding bearing and a housing, the sliding bearing having a bearing alloy layer in the internal surface of its backing metal layer and the internal surface of the housing being fitted with the sliding bearing, wherein a phosphate film is formed on the internal surface of the housing and/or on the back of the backing metal layer of the sliding bearing, the phosphate film being composed of needle crystals or columnar crystals which have a particle size of not more than 30 $\mu$m when observed from the internal surface of the housing or the back of the backing metal layer.

BRIEF DESCRIPTION OF THE DRAWINGS

FIGS. 3(A) and 3(B) are a front view and a side view, respectively, showing the outline of a vibration test.

DETAILED DESCRIPTION OF THE INVENTION

Figure 1:
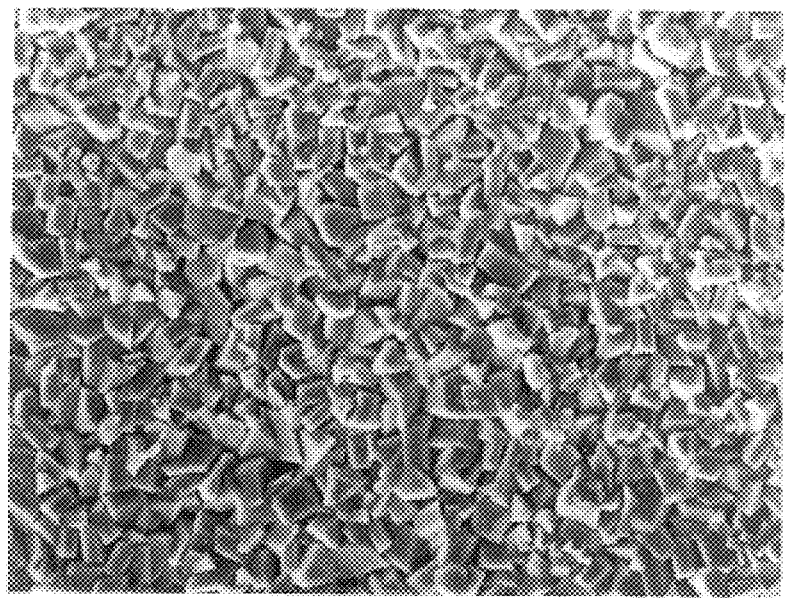
FIG. 1 is a micrograph showing the surface state of the phosphate film in Example 1.

As the phosphate film, typical are zinc phosphate film, manganese phosphate film, calcium phosphate film and iron phosphate film, which can be suitably used. Here, the crystals of zinc phosphate form mainly needle crystals piled diagonally; crystals of manganese phosphate and calcium phosphate form hexahedral columnar crystals; and the crystals of iron phosphate form indefinite, columnar crystals. As a result of experiment, when the sizes of these crystals are not more than 30 $\mu$m when observed from the back of the backing metal, the fretting resistance is remarkably enhanced. Incidentally, the term "not more than 30 $\mu$m" used herein refers to the length of needle crystal and the diagonal length of columnar crystal when the crystals are observed from the internal surface of the housing or the back of the backing metal, namely, observed from the surface.

A phosphate film whose crystal size as defined above is not more than 30 $\mu$m can be obtained by subjecting to preliminary phosphate acid treatment with a diluted, preliminary phosphate treating solution and then to phosphate treatment with a usual phosphate treating solution, namely by subjecting to a plurality of phosphate treatments.

The result that the thus obtained phosphate whose crystal particles are fine is considered to be superior in fretting resistance to phosphates whose crystal particles are coarse is considered to be obtained by the following mechanism:

The film surfaces of the coarse phosphate crystals are composed of rough mound portions and rough valley portions, and when a load is applied, the brittle mound portions of cleavable phosphate crystal are crumbled to fill the valley portions with the crumbled portions. Therefore, the film surface becomes smooth and the valley portions retaining a lubricant are diminished and abrasion tends to be caused owing to lacking in lubricant. This lacking in lubricant facilitates the generation of fretting. On the other hand, the film surfaces of the fine phosphate crystals are composed of a great number of fine mound and valley portions and it follows that these many mound portions bear the load in common. Therefore, the share of load applied to one mound portion becomes small, and the mound portions are hardly crumbled, so that the valley portions are hardly filled with the crumbled portions and it follows that the lubricant is retained in the valley portions. This lubricant imparts excellent fretting resistance.

Incidentally, the phosphate film may be provided on either the internal surface of the housing or the back of the backing metal of the sliding bearing and may further be provided both on the internal surface of the housing and the back of the backing metal of the sliding bearing.

The sliding bering assembly of this invention in which the internal surface of a housing is fitted with a sliding bearing having a bearing alloy layer in the internal surface of the backing metal layer can be allowed to have excellent fretting resistance by forming a phosphate film on the internal surface of the housing and/or the back of the backing metal surface of the sliding bearing, this phosphate film being composed of needle crystals or columnar crystals, and adjusting the size of the crystal particles to not more than 30 μm when observed from the internal surface of the housing or the back of the backing metal.

DESCRIPTION OF PREFERRED EMBODIMENTS

Embodiments of this invention are explained below.

A test was conducted on a sample in which a phosphate film was formed on the back of the backing metal of a half bearing in the form of a half cylinder. As the backing metal, a cold rolled steel plate (JIS G3141SPCC) was used. On the backing metal, a bearing alloy composed of Cu, 1.5% by weight of Sn and 23% by weight of Pb was sintered in a thickness of 0.3 mm and the resultant bimetal was cut and formed into a half cylinder to prepare a half bearing having an internal diameter of 42 mm, an outer diameter of 45 mm and a width of 17 mm. Furthermore, on the bearing alloy, an overlay having a thickness of 15 μm composed of a composition of Pb, 10% by weight of Sn and 10% by weight of In was formed by plating.

In Example 1, the sample was immersed for 20 seconds in an alkaline preliminary phosphate treating solution (the manganese phosphate concentration: 6 g/liter) warmed to 44° C. to form a thin manganese phosphate film on the back of the backing metal, and then immersed for 4 minutes in a phosphate treating solution (the manganese phosphate concentration: 140 g/liter) warmed to 94° C. to form a manganese phosphate film on the back of the backing metal. By the above two phosphate treatments, there was obtained a manganese phosphate film having a thickness of 6.5 μm composed of fine manganese phosphate crystal particles having a crystal diameter of 6 μm as shown in Table 1. FIG. 1 is a micrograph showing the surface state of the phosphate film in Example 1. In Example 2, the same procedure as above was repeated, except that the concentration of manganese phosphate of the preliminary phosphate treating solution was changed to 4 g/liter, to obtain fine crystal particles of manganese phosphate having a crystal particle diameter of 13 μm.

In Examples 3 and 4, two phosphate treatments were conducted in the same manner as in Examples 1 and 2, except that zinc phosphate was substituted for the manganese phosphate, to form a thin zinc phosphate film on the back of the backing metal.

TABLE 1

| | Sample No. | Back of bearing Phosphate film | Crystal particle diameter (μm) | Damage of back of bearing (Fretting abrasion) |
|---|---|---|---|---|
| Example | 1 | Manganese phosphate | 6 | None |
| | 2 | Manganese phosphate | 13 | None |
| | 3 | Zinc phosphate | 10 | None |
| | 4 | Zinc phosphate | 22 | None |
| Comparative Example | 1 | Manganese phosphate | 44 | Found |
| | 2 | Manganese phosphate | 65 | Found |
| | 3 | Zinc phosphate | 41 | Found |
| | 4 | Zinc phosphate | 68 | Found |
| | 5 | None | — | Found |

Figure 2:
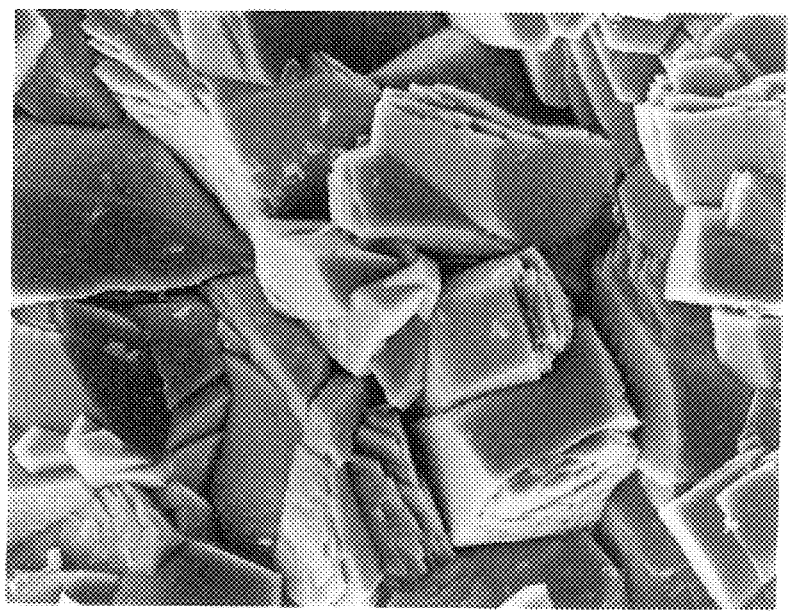
FIG. 2 is a micrograph showing the surface state of the phosphate film in Comparative Example 1.

In Comparative Examples 1 to 4, the sample was subjected directly to one phosphate treatment with the above-mentioned phosphate treating solution without being subjected to the above-mentioned preliminary phosphate treatment. Incidentally, by changing the concentration of the phosphate in the phosphate treating solution, a phosphate films composed of manganese or zinc phosphate crystal particles having a crystal particle diameter of about 40 to 70 μm as shown in Table 1. FIG. 2 is a micrograph showing the surface state of the phosphate film in Comparative Example 1. Moreover, Comparative Example 5 concerns a sample which was not subjected to the phosphate treatment.

Each of the sliding bearings obtained in Examples 1 to 4 and Comparative Examples 1 to 5 was subjected to vibration test by a hydraulic vibration testing machine. The vibration test was carried out under such conditions that each of the sliding bearings of the Examples and the Comparative Examples was mounted to a housing made to simulate the big end portion of a connecting rod of an engine for automobile as shown in FIG. 3 and a vibration load of 4 tons was applied as shown in Table 2. In judgement, whether or not a damage was caused by fretting was observed with the naked eye. As a result, as shown in Table 1, in all the Examples, no damage was caused by fretting, while in all the Comparative Examples, a damage caused by fretting was found.

TABLE 2

| | Test conditions | |
|---|---|---|
| Item | Size | Unit |
| Bearing size | Outer diameter 45 × length 17 × thickness 1.5 | mm |
| Clearance | 0.100 | mm |
| Test load | 4.0 | ton |
| Test wave form | Sine wave | — |
| Frequency | 60 | HZ/sec |
| Number of cycles | 1 × 10$^7$ | cycle |

What is claimed is:

1. A sliding bearing assembly which comprises a sliding bearing and a housing, the sliding bearing having a bearing alloy layer in the internal surface of its backing metal layer and the internal surface of the housing being fitted with the sliding bearing, wherein a phosphate film is formed on the internal surface of the housing and/or on the back of the backing metal layer of the sliding bearing, the phosphate film being composed of needle crystals or columnar crystals which have a particle size of not more than 30 μm when observed from the internal surface of the housing or the back of the backing metal layer.

2. The sliding bearing assembly according to claim 1, wherein the phosphate film is composed of needle crystals or columnar crystals of any one of zinc phosphate, manganese phosphate, calcium phosphate and iron phosphate.

3. A sliding bearing which has a backing metal layer which has a phosphate film formed on its back, the phosphate film being composed of needle crystals or columnar crystals having a particle size of not more than 30 μm when observed from the back of the backing metal layer.

* * * * *